Oct. 23, 1934.                H. M. DODGE                 1,978,041
           METHOD OF MANUFACTURING SPONGE RUBBER STRIPS
                        Filed Oct. 31, 1933

Inventor,
Howard M. Dodge.
By Eakin & Avery
            Attys

Patented Oct. 23, 1934

1,978,041

UNITED STATES PATENT OFFICE 1,978,041

METHOD OF MANUFACTURING SPONGE RUBBER STRIPS

Howard M. Dodge, Akron, Ohio, assignor to The B. F. Goodrich Company, New York, N. Y., a corporation of New York Application October 31, 1933, Serial No. 696,064

6 Claims. (Cl. 18—59)

This invention relates to the manufacture of strips of rubber material such as are used for cushioning purposes where longitudinal extensibility is not required and lateral compressibility is necessary in the finished article.

Such strips comprising sponge rubber are used in the manufacture of automobile bodies to exclude drafts around the doors, and are also useful in the manufacture of weather strip and refrigerator gaskets.

The rubber compositions used in the manufacture of sponge rubber are, when in unvulcanized condition, of extremely low tensile strength. The body of unvulcanized sponge rubber composition before vulcanization is usually about one third the thickness of the vulcanized article, to permit the necessary expansion during sponging thereof. A thin sheet of unvulcanized material of this nature will not support the tension necessary to advance it between mold members of great length without disastrous stretch and consequent thinning or breaking of the sheet.

The low price at which such material must be produced requires that a rapid and inexpensive method of manufacture be employed.

It is also convenient and sometimes desirable to provide the strips with textile reinforcements by which longitudinal stretch is prevented and means for uniting the sponge rubber to other structures is provided.

The principal objects of the present invention are to provide a method of manufacture which will permit progressive vulcanization of continuous lengths of material without substantial longitudinal stretch, to provide greater uniformity of product, and to reduce cost of manufacture.

Other objects of the invention will appear from the following description and the accompanying drawing illustrating a preferred form of the invention.

Figure 1:
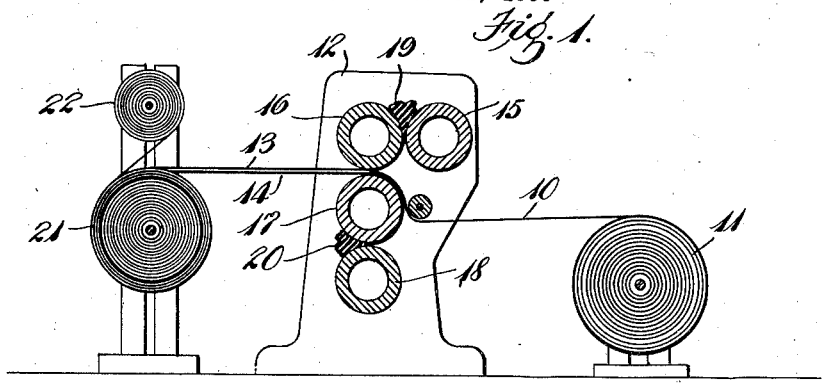
Fig. 1 is a diagrammatic view showing the preferred manner of coating the fibrous reinforcement prior to vulcanization, the apparatus being shown in cross-section.
Figure 2:
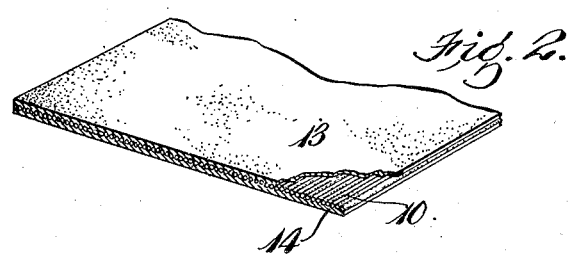
Fig. 2 is a perspective view of the coated sheet prior to vulcanization, part of the coating being broken away to show the reinforcement.
Figure 3:
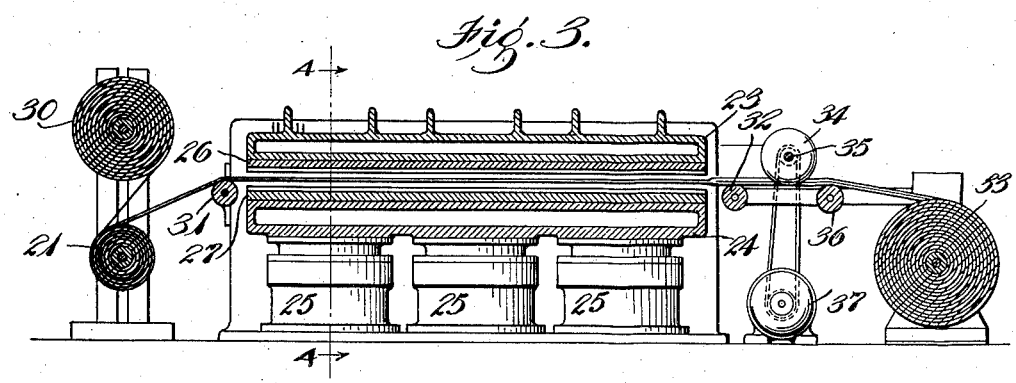
Fig. 3 is a longitudinal sectional view of a vulcanizing press illustrating the vulcanization of the coating to provide the sponge rubber portions of the strips.

Referring to the drawing, a sheet 10 of substantially inextensible material, which may comprise either separate cords or other elements arranged in parallelism, matted fibrous material, or a woven fabric, is drawn from a roll 11 thereof, and passed through a coating device where one or more layers 13, 14 of unvulcanized rubber composition are applied to one or more faces thereof. The coating operation may be accomplished by use of a rubber calender 12 having cooperating rolls 15, 16, 17, and 18. A bank 19 of the rubber composition is formed by rolls 15 and 16 to sheet form. A second bank 20 is similarly formed by rolls 18 and 19. The sheet of inextensible material 10 is passed between rolls 16 and 17 where the two sheets of rubber composition simultaneously are applied to its faces. The coated sheet may be wound onto a roll 21 between a layer of liner material drawn from a roll 22.

The sheet material is now ready for the vulcanizing press which comprises a fixed platen 23, and a movable platen 24 having means such as the hydraulic cylinders 25 for forcing it toward the fixed platen. A pair of molds 26 and 27 are attached one to each platen, and the platens are chambered to provide means for heating the molds.

When the articles desired are in the form of round rods or strips, the molds are formed with mold grooves 28, 29, of half round cross-section. Other forms of grooves may be provided for strips of other shapes, it being desirable, as nearly as possible, to mold-form each strip so that the adjacent strips will be connected only by a thin layer of approximately the thickness of the reinforcing layer.

The roll of sheet material 21 is rotatably supported at one end of the press and the liner is rewound at 30. The sheet is pulled through the press over guide rollers 31 and 32. When the press is completely occupied by the sheet the press is closed and vulcanizing heat applied to the molds. Where sponge rubber composition is employed, the applied heat effects sponging of the composition and completely fills the mold cavities.

After vulcanization is complete, the leading end of the sheet is advanced and wound upon a roll 33 until the trailing end of the vulcanized portion of the sheet is nearly clear of the mold. The press is again closed and a second portion is formed and vulcanized. This method is continued until the entire sheet has been formed and vulcanized.

In order to separate the strips the sheet is passed between a set of rotating circular knives or other separating devices so spaced as to separate the sheet only between formed strips. In order to accomplish this without extra consumption of time the circular knives 34 may be mounted on a shaft 35 at the delivery end of the press where the sheet may pass therethrough as it is wound on the roll 33, a guide roller 36 being provided to maintain the course of the sheet through the knives. The knives may be driven from any convenient source of power such as the electric motor 37.

Figures 4, 5:
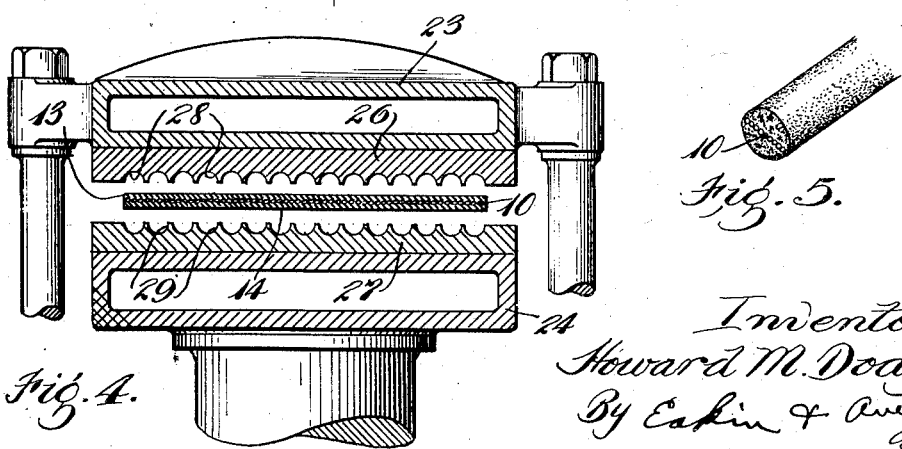
Fig. 4 is a sectional view of the vulcanizing press in open position with the unvulcanized sheet between its platens prior to vulcanization, the section being taken on line 4—4 of Fig. 3.
Fig. 5 is a perspective view of a portion of a finished strip.

The resulting strips each comprise a molded body of rubber having a layer of reinforcing textile material integral therewith, which may be utilized to prevent longitudinal stretch of the strip, and to secure the strip to covering material. Where the sheet of reinforcing material has been coated on both sides with sponge rubber composition, the resulting strips will have the reinforcing layer extending laterally between molded sponge rubber bodies united thereto as illustrated in Fig. 5.

The presence of the reinforcing material in the sheet before vulcanization insures even distribution of the rubber composition throughout the length of the mold as it prevents stretching of the unvulcanized sheet of rubber composition.

The reinforcing material also assists, during the vulcanization of the sponge rubber composition, in the production of a uniform cell structure of the sponge, as it provides a vent for gases formed at the center of the mass of sponge rubber.

I claim:

1. The method of making rubber strip material which comprises coating a substantially inextensible sheet of fibrous material with a layer of unvulcanized rubber composition, progressively pressing the sheet between mold members to divide the rubber layer into parallel strips while vulcanizing the same, and cutting the fibrous sheet between the strips to separate the strips.

2. The method of making rubber strip material which comprises coating a substantially inextensible sheet of fibrous material with a layer of unvulcanized sponge rubber composition, progressively pressing the sheet between mold members to divide the rubber layer into parallel strips, while effecting sponging and vulcanization thereof, and cutting the fibrous sheet between the strips to separate the strips.

3. The method of making rubber strip material which comprises coating opposite sides of a substantially inextensible sheet of fibrous material with a layer of unvulcanized rubber composition, progressively pressing the sheet between mold members to divide the rubber layers into aligned parallel strips on opposite faces of the fibrous sheet while vulcanizing the same, and cutting the fibrous sheet between the strips to separate the strips.

4. The method of making rubber strip material which comprises coating opposite sides of a substantially inextensible sheet of fibrous material with a layer of unvulcanized sponge rubber composition, progressively pressing the sheet between mold members to divide the rubber into strips while effecting sponging and vulcanization thereof, and cutting the sheet between the strips to separate the strips.

5. The method of making rubber strip material which comprises coating a substantially inextensible sheet of fibrous material with a layer of sponge rubber composition, applying pressure along the face of the sheet to form the coating into parallel longitudinal strips, effecting sponging and vulcanization of the material in the strips, and then separating the sheet along lines between the strips.

6. The method of making rubber strip material which comprises forming parallel strips of unvulcanized sponge rubber composition on the face of a substantially inextensible sheet, effecting sponging and vulcanization of the strips, and then separating the sheet between the strips.

HOWARD M. DODGE.